US012633533B2

(12) United States Patent (10) Patent No.: US 12,633,533 B2
Katou et al. (45) Date of Patent: May 19, 2026

(54) METHOD FOR PRODUCING LITHIUM TRANSITION METAL COMPLEX OXIDE

(71) Applicant: PANASONIC INTELLECTUAL PROPERTY MANAGEMENT CO., LTD .., Osaka (JP)

(72) Inventors: Daisuke Katou, Kyoto Fu (JP); Takuya Jin, Osaka Fu (JP); Mitsuru Iwai, Osaka Fu (JP); Tomoo Takayama, Osaka Fu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 948 days.

(21) Appl. No.: 17/794,763

(22) PCT Filed: Jan. 21, 2021

(86) PCT No.: PCT/JP2021/001963
§ 371 (c)(1),
(2) Date: Jul. 22, 2022

(87) PCT Pub. No.: WO2021/153400
PCT Pub. Date: Aug. 5, 2021

(65) Prior Publication Data
US 2023/0057410 A1 Feb. 23, 2023

(30) Foreign Application Priority Data
Jan. 30, 2020 (JP) ................................. 2020-014234

(51) Int. Cl.
$H01M\ 4/525$ (2010.01)
$C01G\ 53/82$ (2025.01)
$H01M\ 4/02$ (2006.01)

(52) U.S. Cl.
CPC ........... $H01M\ 4/525$ (2013.01); $C01G\ 53/82$ (2025.01); $C01P\ 2006/40$ (2013.01); $H01M\ 2004/021$ (2013.01); $H01M\ 2004/028$ (2013.01)

(58) Field of Classification Search
None
See application file for complete search history.

(56) References Cited

U.S. PATENT DOCUMENTS 5,567,539 A * 10/1996 Takahashi ......... $H01M\ 50/3425$
429/57
6,077,496 A 6/2000 Ito et al.
(Continued)

FOREIGN PATENT DOCUMENTS

CN 101679074 A 3/2010
CN 105765770 A 7/2016
(Continued)

OTHER PUBLICATIONS

Office Action dated Jan. 13, 2023, issued in counterpart CN Application No. 202180011057.X, with English translation of Search Report. (10 pages).
(Continued)

*Primary Examiner* — John J Figueroa
(74) *Attorney, Agent, or Firm* — WHDA, LLP

(57) ABSTRACT
A method for producing a lithium-transition metal composite oxide, including steps of preparing a mixture including a lithium-containing compound and a transition metal compound; obtaining a molded body of the mixture; and sintering the molded bodies in a container having at least one vent hole, to obtain sintered bodies.

7 Claims, 3 Drawing Sheets

(56)         References Cited

U.S. PATENT DOCUMENTS

| | | | |
|---|---|---|---|
| 12,176,531 B2 * | 12/2024 | Arimura ................ | H01M 4/131 |
| 12,334,538 B2 * | 6/2025 | Sakitani ................. | H01M 4/485 |
| 2002/0042984 A1 | 4/2002 | Kumazawa et al. | |
| 2004/0185341 A1 * | 9/2004 | Yamamoto ........ | H01M 10/0587 |
| | | | 429/209 |
| 2005/0008940 A1 * | 1/2005 | Adachi ............ | H01M 10/0565 |
| | | | 429/327 |
| 2009/0194734 A1 | 8/2009 | Arimoto | |
| 2013/0209888 A1 * | 8/2013 | Nagai ................... | H01M 4/485 |
| | | | 429/231.1 |
| 2015/0380726 A1 * | 12/2015 | Nakanishi ............... | H01M 4/42 |
| | | | 429/223 |
| 2016/0030923 A1 | 2/2016 | Lawing et al. | |
| 2016/0293952 A1 | 10/2016 | Kaneda et al. | |
| 2017/0309911 A1 | 10/2017 | Ryoshi et al. | |
| 2020/0251733 A1 | 8/2020 | Takano et al. | |
| 2020/0358093 A1 | 11/2020 | Oshita et al. | |
| 2022/0059835 A1 * | 2/2022 | Katou ................... | H01M 4/505 |
| 2022/0109139 A1 * | 4/2022 | Suzuki ................ | H01M 4/0433 |
| 2022/0344707 A1 * | 10/2022 | Yoshioka ................. | H01B 1/08 |

FOREIGN PATENT DOCUMENTS

| | | | | |
|---|---|---|---|---|
| CN | 107001071 A | | 8/2017 | |
| IN | 107406274 A | | 11/2017 | |
| JP | H05-62678 A | | 3/1993 | |
| JP | H11135118 A | † | 5/1999 | |
| JP | H11-307094 A | | 11/1999 | |
| JP | 2000-123829 A | | 4/2000 | |
| JP | 2000-203950 A | | 7/2000 | |
| JP | 2002145672 A | † | 5/2002 | |
| JP | 2002265281 A | † | 9/2002 | |
| JP | 2003306386 A | † | 10/2003 | |
| JP | 2005-257171 A | | 9/2005 | |
| JP | 2005249235 A | † | 9/2005 | |
| JP | 2008-103100 A | | 5/2008 | |
| JP | 2010-241626 A | | 10/2010 | |
| JP | 2011-146309 A | | 7/2011 | |
| JP | 2014-063708 A | | 4/2014 | |
| JP | 2017-117700 A | | 6/2017 | |
| JP | 2018-041657 A | | 3/2018 | |
| JP | 2018-104276 A | | 7/2018 | |
| JP | 2019-099406 A | | 6/2019 | |
| KR | 20190076767 A | | 7/2019 | |
| WO | 2012/133525 A1 | | 10/2012 | |
| WO | 2018/021453 A1 | | 2/2018 | |
| WO | 2019066545 A1 | † | 4/2019 | |
| WO | 2019/087494 A1 | | 5/2019 | |
| WO | 2019/131779 A1 | | 7/2019 | |

OTHER PUBLICATIONS

Office Action dated Jan. 21, 2025, issued in counterpart JP Application No. 2021-574684. (4 pages).

International Search Report dated Apr. 6, 2021, issued in counterpart Application No. PCT/JP2021/001963, with English Translation. (10 pages).

Waitz, David, Packing in the Spheres, Science 303.5660, 2004, p. 968-969. (2 pages).

"Random close pack", Published online by Wikipedia, the free encyclopedia, Webpage https://en.wikipedia.org/w/index.php?title= Random_close_pack&oldid528454367, 3 pages, shows a publication date of Dec. 17, 2012, Accessed on Jan. 23, 2024.†

* cited by examiner
† cited by third party

METHOD FOR PRODUCING LITHIUM TRANSITION METAL COMPLEX OXIDE

TECHNICAL FIELD

The present disclosure relates to a method for producing a lithium-transition metal composite oxide.

BACKGROUND ART

A secondary battery represented by a lithium ion secondary battery includes a positive electrode, a negative electrode, and an electrolyte. The positive electrode includes, as a positive electrode active material, for example, a lithium-transition metal composite oxide. As the lithium-transition metal composite oxide, for example, a lithium-nickel composite oxide or lithium nickelate ($LiNiO_2$) is used which is advantageous in achieving a higher capacity. With an aim of further improving the battery performance, studies have been made to replace part of the nickel with a different metal.

Patent Literature 1 teaches a method for producing a positive electrode active material constituted of a lithium-nickel composite oxide for a non-aqueous electrolyte secondary battery. The method includes a step of packing a mixture having a bulk density of 1.0 to 2.2 g/mL which is obtained by mixing a nickel composite compound having an average particle diameter of 8 to 20 μm and a lithium compound, into a baking container, and baking the mixture. In this step, the mixture is baked in an oxidizing atmosphere having an oxygen concentration of 60 vol % or more, with the holding time for which the temperature of the mixture is held in the range of 550° C. or higher and 650° C. or lower set to be equal to or longer than the minimum holding time determined by the formula: Time (min)=0.026 $t^2$−2.7, where t represents a thickness (mm) of the mixture placed in the baking container, and the obtained baked product is washed with water.

Patent Literature 2 discloses a baking tool used for baking a mixture including a lithium compound and a transition metal compound, to synthesize a lithium-containing composite oxide serving as a positive electrode active material for a non-aqueous electrolyte secondary battery. The literature teaches containing lithium and at least one metal element selected from the group consisting of scandium, titanium, vanadium, manganese, chromium, yttrium, zirconium, and niobium, in the baking tool. In view of the durability, the porosity of the baking tool is set to 0.5 to 40%.

Patent Literature 3 discloses a method for producing a lithium-nickel composite oxide, including: supplying a plurality of molded bodies each obtained by molding a mixture including powder of a nickel-containing compound and a lithium-containing compound, continuously or intermittently into a vertical furnace from its upper part; sintering the molded bodies in the vertical furnace; and ejecting a plurality of the sintered molded bodies, continuously or intermittently from the lower part of the vertical furnace to the outside.

CITATION LIST

Patent Literature

[PTL 1] Japanese Laid-Open Patent Publication No. 2011-146309
[PTL 2] Japanese Laid-Open Patent Publication No. 2008-103100

[PTL 3] Japanese Laid-Open Patent Publication No. 2019-99406

SUMMARY OF INVENTION

With a baking container or a baking tool as used in Patent Literatures 1 and 2, when the amount of the material packed in the baking container or the baking tool is increased in view of improving the productivity, the crystallinity of a composite oxide produced by baking tends to be reduced.

Molding a mixture and sintering the molded bodies as in Patent Literature 3 is advantageous for improving the crystallinity of a composite oxide to be produced. However, when a large amount of the molded bodies are supplied into the furnace, gas may become difficult to circulate within the furnace, making it difficult to transfer heat to the molded bodies, and the crystallinity of the sintered bodies may be reduced in some cases.

One aspect of the present disclosure relates to a method for producing a lithium-transition metal composite oxide, including steps of preparing a mixture including a lithium-containing compound and a transition metal compound; obtaining a molded body of the mixture; and sintering the molded bodies in a container having at least one vent hole, to obtain sintered bodies.

According to the present disclosure, the crystallinity of the lithium-transition metal composite oxide can be improved.

DESCRIPTION OF EMBODIMENTS

Figures 1A, 1B, 1C, 1D:
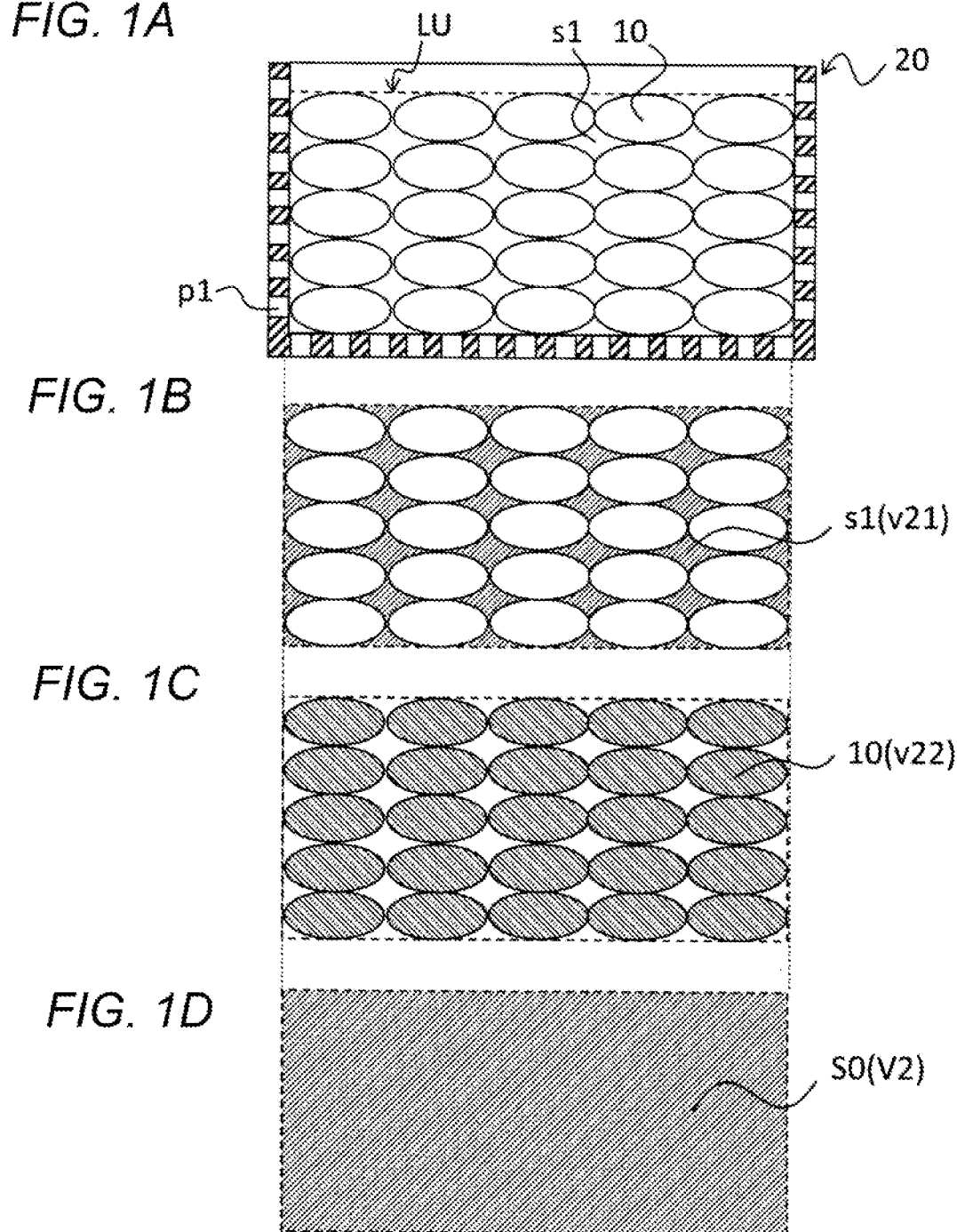
FIG. 1A-FIG. 1D Conceptual diagrams of molded bodies packed in a container having vent holes.

A method for producing a lithium-transition metal composite oxide according to an embodiment of the present disclosure includes a step of preparing a mixture including a lithium-containing compound and a transition metal compound (hereinafter sometimes referred to as a raw material mixture), a step of obtaining a molded body of the raw material mixture, and a step of sintering the molded bodies in a container having at least one vent hole, to obtain sintered bodies (i.e., lithium-transition metal composite oxide).

By forming a molded body from a raw material mixture of a lithium-containing compound and a transition metal compound, and sintering the molded bodies, the points of contact between particles in the molded body are increased, and the thermal conductivity of the molded body is improved, which is advantageous for the proceeding of sintering. Furthermore, gaps are formed between the molded bodies, and the circulation of gas (e.g., supply gas, such as air or oxygen) in the container is improved, which is also advantageous for the proceeding of sintering. As a result, the crystallinity of the lithium-transition metal composite oxide produced by sintering is improved.

However, the moisture generated during sintering is released as water vapor from the molded bodies. When the water vapor stays in the container, this offsets the improved circulation of the supply gas. The distribution of water vapor within the molded body tends to be restricted, and the pressure of the water vapor when released from the molded body tends to be high. Moreover, sintering rapidly proceeds in the molded body, causing a large amount of water vapor to be generated therefrom. Accordingly, as compared to when sintering the powder as it is, much water vapor is generated. Therefore, in sintering the molded bodies, water vapor is more likely to stay in the container. As a result, especially when the amount of molded bodies packed in the container is increased, it becomes difficult in some cases to sufficiently improve the crystallinity of the lithium-transition metal composite oxide.

On the other hand, when the container for containing molded bodies is provided with vent holes, water vapor released from the molded body tends to be immediately discharged outside the container, and the water vapor is less likely to stay in the container. This, as a result, increases the concentration of the supply gas, such as air or oxygen, in the container, which can facilitate the sintering of the molded bodies. Therefore, even when the amount of molded bodies packed in the container is increased, it is easy to improve the crystallinity of the lithium-transition metal composite oxide.

A preferable material of the container is ceramics, in terms of the corrosion resistance to lithium-containing compounds and the durability against high temperatures. Examples of the ceramics include alumina, silica, silica alumina, aluminum nitride, silicon carbide, silicon nitride, zirconia, mullite, and cordierite.

The container for containing molded bodies may be in a shape, for example, having a bottom and a side wall rising from the periphery of the bottom. In this case, at least one of the bottom and the side wall has at least one vent hole. The container is usually open at the top. When the container has an approximate rectangular shape, at least one of four portions constituting the side wall has at least one vent hole.

The depth of the container (the height of the space inside the container that can contain the molded bodies) may be, for example, 20 mm or more and 300 mm or less, may be 100 mm or more and 300 mm or less, and may be 200 mm or more and 300 mm or less. In view of the ease of handling of the molded bodies in the process of sintering the molded bodies, the upper opening of the container may have, for example, a rectangular shape of 100 mm or more and 500 mm or less long, and 100 mm or more and 500 mm or less wide.

In view of improving the crystallinity of the lithium-transition metal composite oxide, a higher porosity of the container is more preferable. The porosity refers to a ratio of a volume $v_{11}$ occupied by vent holes (i.e., voids) to an apparent volume $V_1$ of a member (e.g., bottom or side wall) that constitutes the container (when the member is a plate-like material, $V_1$=area of principal surface of member× thickness). The porosity may be set, depending on the material of the container, to be largest possible within the range that can ensure the strength of the container.

When the container has a bottom and a sidewall rising from the periphery of the bottom, the porosity in at least one of the bottom and the sidewall may be, for example, 51% or more and 82% or less. When the porosity is set to 82% or less, the strength of the container is maintained high, and the life of the container can be prolonged.

The bottom or the side wall of the container may be a porous material having continuous pores. Examples of such a porous material include a spongy material, and sintered ceramic particles. With a bottom or a sidewall formed of a porous material having continuous pores, the release of water vapor and the entry and exit of supply gas are possible through almost all over the bottom or the sidewall.

The bottom or the side wall of the container may be a porous material having through-holes. A bottom or a side-wall formed of a porous material having through-holes has a comparatively high strength, and the life of the container is prolonged. The average opening area of the through-holes (i.e., vent holes) and the number of through-holes are selected as appropriate, depending on the desired porosity. The average opening area of the vent holes is defined as an average of the values of the opening area per one through-hole that is open to the outer surface of the bottom or side wall. The average may be, for example, an average of the opening areas of five or more through-holes.

The average opening area of the vent holes may be any area that does not allow the molded body to pass through, but is desirably such an area that can prevent as much as possible the falling off of a crushed material generated from the molded body. The average opening area of the vent holes may be set to, for example, 0.7 mm$^2$ or more and 20 mm$^2$ or less, and may be set to 10 mm$^2$ or more and 20 mm$^2$ or less.

The space ratio occupied by gaps between the molded bodies in the container may be, for example, 0.35 or more, or 0.4 or more. The higher the space ratio is, the less likely the water vapor is to stay in the container, making it easier to increase the concentration of the supply gas, such as air or oxygen, in the container. It should be noted, however, that a higher space ratio means that the amount of the molded bodies packed in the container is reduced. The upper limit of the space ratio may be determined in consideration of the productivity.

Regardless of the depth of the container, the space ratio refers to a ratio of a volume $v_{21}$ of the space occupied by gaps between the molded bodies to a volume $V_2$ of the "apparent space" occupied by the molded bodies. The volume $V_2$ of the apparent space is the sum of an actual volume $v_{22}$ of the molded bodies and the volume $v_{21}$ of the gaps. The space ratio $R_s$ is expressed by the following formula, where d represents a bulk density obtained by dividing the total mass of the molded bodies packed in the container by the volume $V_2$ of the apparent space, and D represents a true density of the molded bodies.

$$Rs = 1 - v22/V2 = 1 - d/D$$

Referring to FIG. 1A, the apparent space occupied by the molded bodies is a space between the bottom inner surface of a container 20 with a plurality of vent holes p1 and a packed level LU of molded bodies 10. The areas hatched with oblique lines in FIG. 1B show a space s1 occupied by the gaps between the molded bodies 10, and its volume is $v_{21}$. The areas hatched with oblique lines in FIG. 1C show a space actually occupied by the molded bodies 10, and its volume is $v_{22}$. The area hatched with oblique lines in FIG. 1D shows an apparent space S0, and its volume is $V_2$ ($=v_{21}+v_{22}$).

The maximum length L of the molded body may be, for example, 6 mm or more, may be 20 mm or more, and may be 25 mm or more. By using such a large molded body, the circulation of gas through the gaps between the molded bodies can be facilitated. On the other hand, in view of allowing the sintering to proceed smoothly up to the center of the molded body, the maximum length L of the molded body may be set to, for example, 60 mm or less, and may be set to 40 mm or less.

The ratio: h/L of the minimum length h of the molded body to the maximum length L of the molded body may be, for example, 0.4 or more and 1.0 or less (or less than 1.0), and may be 0.4 or more and 0.9 or less. The molded body in such a flat shape (e.g., spheroidal (long spherical), almond-like, etc.) is excellent in productivity because sintering can proceed more rapidly up to the center of the molded body, and more molded bodies can be packed into the container.

Figure 2:
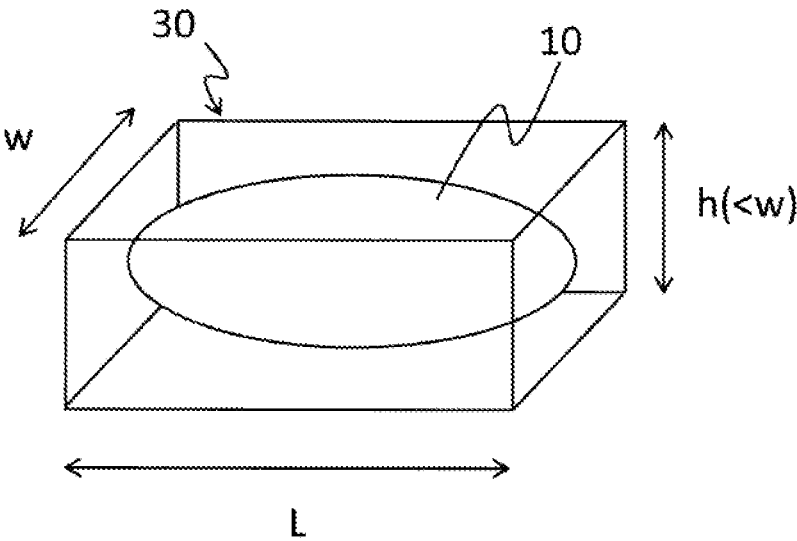
FIG. 2 A diagram showing how to determine an aspect ratio of the molded body.

The maximum length L and the minimum length h of the molded body 10 can be determined from the smallest rectangular parallelepiped that circumscribes the molded body. Of all sides of the six squares constituting the smallest rectangular parallelepiped, the length of the longest side of all sides is the maximum length L. The length of the shortest side of all sides is the minimum length h. As illustrated in FIG. 2, once a smallest rectangular parallelepiped 30 that circumscribes the molded body 10 is defined, the maximum length L, the width w, and the minimum length (height) h are determined, from which the aspect ratio: h/L can be calculated.

The maximum length L and the minimum length h of the molded body may be, for example, an average of 10 values of the maximum length L and an average of 10 values of the minimum length h, respectively, determined for any 10 molded bodies. The aspect ratio also may be an average of 10 values of the aspect ratio determined for any 10 molded bodies.

Figure 3:
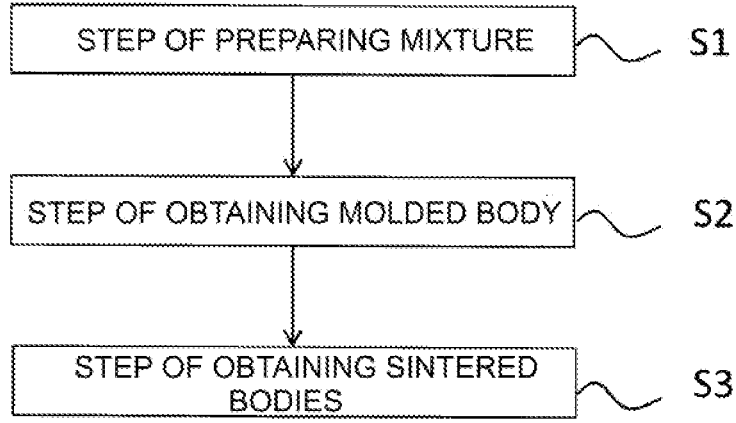
FIG. 3 A flow chart of a method for producing a lithium-transition metal composite oxide according to one embodiment of the present disclosure.

A description will be given below with reference to FIG. 3.

A method for producing a lithium-transition metal composite oxide according to the present embodiment includes a first step (S1) of preparing a raw material mixture including a lithium-containing compound and a transition metal compound, a second step (S2) of obtaining a molded body of the raw material mixture, and a third step (S3) of sintering the molded bodies in a container having at least one vent hole, to obtain sintered bodies (i.e., lithium-transition metal composite oxide).

(1) First Step (S1)

In the first step (S1) of preparing a raw material mixture, a lithium-containing compound and a transition metal compound which are raw materials of the lithium-transition metal composite oxide are prepared, and they are mixed. The lithium-containing compound and the transition metal compound may be mixed by any method. For example, mixing the lithium-containing compound and the transition metal compound by dry process can provide a raw material mixture which is advantageous for being subjected to the subsequent step. In the dry mixing of the lithium-containing compound and the transition metal compound, the lithium-containing compound and the transition metal compound are mixed without using a dispersion medium, such as water.

(2) Second Step (S2)

In the second step (S2) of obtaining a molded body of the raw material mixture, the raw material mixture is compressed at least once. In other words, a pressure for allowing the lithium-containing compound and the transition metal compound to aggregate together is applied to the raw material mixture. The molded body obtained in the second step is a lumpy material in which a plurality of (e.g., 1000 or more) particles of the transition metal compound are aggregated.

In the second step, the raw material mixture may be molded by any method. For the molding of the raw material mixture, for example, a briquette molding machine, a pellet molding machine, a granulator, a tableting machine, or the like can be used.

Beforehand, the raw material mixture may be preliminarily compressed, using, for example, a nip roll. By passing the raw material mixture through the nip between a pair of rolls, for example, flakes of compressed body can be obtained. Thereafter, the compressed body may be molded into a molded body.

The molding of the raw material mixture is preferably carried out by dry process. In the compression by dry process, the raw material mixture is compressed without using a dispersion medium, such as water.

The molded body may be of any shape, and may be, for example, particulate, spherical, spheroidal (long spherical), columnar, elliptical columnar, prismatic, disk-like, or almond-like.

(3) Third Step (S3)

In the third step (S3) of obtaining sintered bodies (lithium-transition metal composite oxide), a plurality of the molded bodies are packed into a container having predetermined vent holes, and the molded bodies are sintered at, for example, 600° C. or higher and 850° C. or lower in an oxidizing atmosphere, while an oxidizing gas is supplied to the molded bodies in the container. The sintering time may be, for example, 2 hours or more and 30 hours or less. The oxidizing gas usually contains oxygen. The oxidizing gas may be air or an atmosphere having a higher oxygen partial pressure than air. The oxygen concentration in the oxidizing atmosphere may be, for example, 20% or more.

At this time, the height measured from the inner surface of the bottom of the container to the level LU of the packed molded bodies may be set to, for example, 90% or more of the depth of the container (the height of the space that can contain the molded bodies inside the container). Even when the molded bodies are packed in such a large amount, by providing the container with vent holes, the sintering can be allowed to proceed sufficiently.

The sintering furnace may be of a vertical type or a horizontal type, but may be, for example, a tunnel-type horizontal sintering furnace.

Next, a description will be given of the raw materials of the raw material mixture.

The lithium-containing compound may be lithium hydroxide, lithium oxide, lithium carbonate, and the like. In particular, lithium hydroxide has high reactivity with a transition metal compound and is advantageous for improving the crystallinity of the lithium-transition metal composite oxide. When lithium hydroxide is used, for the material of the container, it is desirable to use ceramics, such as mullite, having high corrosion resistance.

Lithium hydroxide is usually in the powder form and has an average particle diameter (D50: particle diameter at a cumulative volume of 50% measured with a laser diffraction particle size distribution analyzer) of, for example, 10 μm or more and 500 μm or less.

When lithium hydroxide is used, the lithium hydroxide is preferably heated and dried beforehand. In the case of using lithium hydroxide having been heated and dried, the release of water from the molded bodies during sintering is suppressed, and a lithium-transition metal composite oxide having high crystallinity can be easily obtained.

The heating temperature of the lithium hydroxide is preferably equal to or higher than 100° C. and equal to or lower than its melting point. At 100° C. or higher, the moisture contained in the lithium hydroxide can be efficiently removed. When the heating temperature is equal to or lower than the melting point, the lithium hydroxide can remain in a particulate form, and the workability is improved, and thus, a homogeneous mixture of the lithium-containing compound and the transition metal compound can be easily obtained. The heating time of the lithium hydroxide is, for example, 1 hour or more and 10 hours or less. The heating of the lithium hydroxide may be performed in air, but is preferably performed in a non-oxidizing atmosphere containing nitrogen, argon, or the like.

The transition metal compound may be, for example, a transition metal hydroxide, a transition metal oxide, a transition metal sulfate, a transition metal nitrate, a transition metal carbonate, a transition metal oxalate, and the like.

Examples of the metal contained in the transition metal compound includes Ni, Co, Al, Mn, Nb, Zr, B, Mg, Fe, Cu, Zn, Sn, Na, K, Ba, Sr, Ca, W, Mo, Si, Ti, Fe, and Cr. The transition metal compound may be used singly or in combination of two or more kinds. Also, a composite transition metal compound containing two or more kinds of metals may be used. In particular, in obtaining a positive electrode active material with high capacity, it is preferable to use at least Ni. Therefore, the transition metal compound is preferably a nickel-containing compound.

Examples of the nickel-containing compound include nickel hydroxide, nickel oxide, nickel sulfate, nickel nitrate, nickel carbonate, and nickel oxalate. The nickel-containing compound may include a metal M1 other than lithium and nickel. For example, it may be a composite hydroxide containing nickel and the metal M1 (hereinafter sometimes referred to as a composite hydroxide A), or a composite oxide containing nickel and the metal M1 (hereinafter sometimes referred to as a composite oxide B).

The composite oxide B can be obtained by, for example, heating the composite hydroxide A to 300° C. or higher and 800° C. or lower. When the composite oxide B obtained by applying heat treatment to the composite hydroxide A is used as a material of the molded body, the production of water from the molded bodies during sintering can be suppressed. This can suppress the reduction in the contact degree between the lithium-containing compound and the composite oxide B and the reduction in the thermal conductivity of the molded body, tending to lead to an improved crystallinity of the sintered bodies (lithium-nickel composite oxide). In particular, it is preferable to use a raw material mixture of lithium hydroxide and the composite oxide B for the production of a molded body.

The composite oxide B includes a material in which the Ni sites in the crystal lattice of the nickel oxide are partially substituted by the metal M1, or in which the metal M1 is solid-dissolved in the nickel oxide. When the heating temperature of the composite hydroxide A is within the above range, the composite oxide B can be efficiently obtained. The heating time of the composite hydroxide A is, for example, 30 minutes or more and 10 hours or less. Heating of the composite hydroxide A may be performed in a non-oxidizing atmosphere containing nitrogen or the like, and may be performed in an oxidizing atmosphere containing oxygen or the like. The oxidizing atmosphere may be air or an atmosphere having a higher oxygen partial pressure than air. The oxygen concentration in the oxidizing atmosphere is, for example, 20% or more.

The composite hydroxide A can be produced using a known technique, such as coprecipitation. When using coprecipitation, an alkali is added to an aqueous solution containing a nickel salt and a salt of the metal M1, to coprecipitate the composite hydroxide A. The nickel salt may be nickel sulfate and the like. When the metal M1 includes cobalt and aluminum, the salt of the metal M1 may be cobalt sulfate, aluminum sulfate, and the like. The alkali may be sodium hydroxide and the like. The salt and the alkali are not limited to the above.

Nickel is advantageous for achieving a higher capacity and cost reduction. The metal M1 may include cobalt, and may include a metal M2 other than cobalt. Cobalt is advantageous, for example, for prolonging the battery life. The metal M2 preferably includes at least aluminum. Aluminum is advantageous, for example, for improving the thermal stability. Using a lithium-containing composite oxide containing nickel and aluminum or a lithium-containing composite oxide containing nickel, cobalt and aluminum as the positive electrode active material is effective for achieving a higher capacity and a longer life of a secondary battery.

In view of the stabilization of the crystal structure, the metal M2 may further include at least one selected from the group consisting of manganese, tungsten, niobium, magnesium, zirconium, and zinc.

The composite hydroxide A preferably includes a composite hydroxide containing nickel, cobalt, and the metal M2. When such a composite hydroxide is used, nickel, cobalt, and the metal M2 can be easily dispersed uniformly in the molded body.

Given that the atomic ratio of nickel, cobalt and the metal M2 contained in the composite hydroxide A is Ni: Co: M2=(1−x−y): x: y, x preferably satisfies $0 \leq x < 0.15$, further $0.01 < x < 0.15$, and y satisfies $0.001 < y < 0.1$. In this case, the effect of using nickel, cobalt, the metal M2 (or, nickel and the metal M2) can be obtained in a balanced manner.

The composite hydroxide obtained by coprecipitation can form secondary particles each composed of primary particles aggregated together. The secondary particles of the composite hydroxide have an average particle diameter (D50: particle diameter at a cumulative volume of 50% measured with a laser diffraction particle size distribution analyzer) of, for example, 2 μm or more and 20 μm or less.

When molded bodies obtained from a raw material mixture including lithium hydroxide and the composite oxide B are sintered at 600° C. or higher and 850° C. or lower, into a lithium-nickel composite oxide (sintered bodies), a layered rock-salt type lithium-nickel composite oxide in which part of nickel in lithium nickelate ($LiNiO_2$) is substituted by the metal M1 can be obtained. By substituting part of nickel by the metal M1, the battery performance can be further improved.

The lithium-nickel composite oxide preferably has a composition represented by a formula: $Li_aNi_{1−x−y}Co_xM2_yO_2$. In the formula, a satisfies $0.9 < a < 1.1$, x satisfies $0 \leq x < 0.15$, and further satisfies $0.01 < x < 0.15$, and y satisfies $0.001 < y < 0.1$. By using the lithium-nickel composite oxide having the above composition as the positive electrode active material, a secondary battery with high capacity and long life can be obtained.

When the lithium-nickel composite oxide having the above composition is produced, $Ni_{1−x−y}Co_xM2_y(OH)_2$ may be used as the composite hydroxide A. The lithium hydroxide and the composite oxide B are mixed such that, in the raw material mixture used for the production of a molded body, the atomic ratio: Li/(Ni+M1) of lithium to the total of nickel and the metal M1 in the composite oxide B, for example, exceeds 0.9 but is less than 1.1.

The obtained sintered body may be crushed into powder. The powder may be classified so as to have a desired particle size distribution. For crushing the sintered body, a ball mill, a mortar, or the like is used. For classification, a sieve or the like is used.

The lithium-transition metal composite oxide can form secondary particles each composed of primary particles aggregated together. The secondary particles of the lithium-transition metal composite oxide have an average particle diameter (D50: particle diameter at a cumulative volume of 50% measured with a laser diffraction particle size distribution analyzer) of, for example, 2 μm or more and 20 μm or less.

The lithium-transition metal composite oxide obtained by the above production method can be suitably used as the positive electrode active material for a secondary battery. The secondary battery includes: a positive electrode including a positive electrode active material capable of electrochemically absorbing and releasing lithium ions; a negative electrode including a negative electrode active material capable of electrochemically absorbing and releasing lithium ions; and an electrolyte.

The positive electrode includes, for example, a positive electrode current collector, and a positive electrode mixture layer formed on a surface of the positive electrode current collector. The positive electrode mixture includes the positive electrode active material as an essential component, and may further include a binder, a conductive agent, and the like, as optional components.

The negative electrode includes, for example, a negative electrode current collector, and a negative electrode mixture layer formed on a surface of the negative electrode current collector. The negative electrode mixture includes the negative electrode active material as an essential component, and may further include a binder, a thickener, and the like, as optional components.

Examples of the negative electrode active material include a carbon material, silicon, a silicon compound, metal lithium, and a lithium alloy. The carbon material may be, for example, graphite (e.g., natural graphite, artificial graphite), amorphous carbon, and the like.

The electrolyte may be a liquid electrolyte in which a solute, such as a lithium salt, is dissolved in a solvent. The solvent may be a non-aqueous solvent, and may be water. The electrolyte may be a solid electrolyte.

Usually, a separator is interposed between the positive electrode and the negative electrode. The separator is excellent in ion permeability and has moderate mechanical strength and electrically insulating properties. The separator may be, for example, a microporous thin film, a woven fabric, or a nonwoven fabric. The separator is preferably made of, for example, polyolefin, such as polypropylene or polyethylene.

Figure 4:
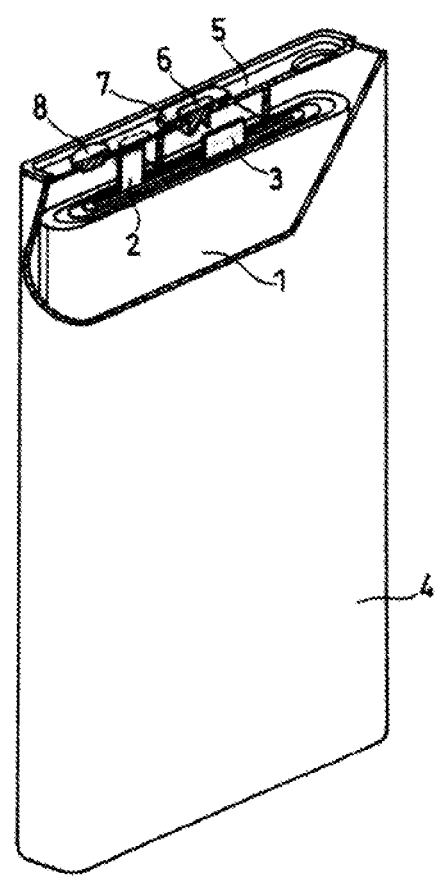
FIG. 4 A partially cut-away schematic oblique view of a prismatic secondary battery.

FIG. 4 is a partially cut-away schematic oblique view of a prismatic secondary battery. The battery includes a bottomed prismatic battery case 4, and an electrode group 1 and a liquid electrolyte (not shown) housed in the battery case 4. The electrode group 1 is of a wound type having a long negative electrode, a long positive electrode, and a separator interposed therebetween.

A negative electrode lead 3 is attached at its one end to the negative electrode current collector of the negative electrode, and connected at its other end to a negative electrode terminal 6 provided on a sealing plate 5. The negative electrode terminal 6 is electrically insulated from the sealing plate 5 by a resin gasket 7. A positive electrode lead 2 is attached at its one end to the positive electrode current collector of the positive electrode, and connected at its other end to the back side of the sealing plate 5. The opening of the battery case 4 is sealed by laser-welding the periphery of the sealing plate 5 to the opening end. The electrolyte injection port provided in the sealing plate 5 is closed with a sealing stopper 8.

The present disclosure will be specifically described below with reference to Examples and Comparative Examples. It is to be noted, however, the present disclosure is not limited to the following Examples.

Example 1

First Step

Lithium hydroxide monohydrate (average particle diameter (D50): 50 μm) was dried by heating at 150° C. for one hour, to prepare a lithium hydroxide. $Ni_{0.85}Co_{0.12}Al_{0.03}$ $(OH)_2$ (average particle diameter (D50) of secondary particles: approx. 15 μm) was obtained as a composite hydroxide A by coprecipitation. The $Ni_{0.85}Co_{0.12}Al_{0.03}(OH)_2$ was heated at 700° C. in air for two hours, and thus, $Ni_{0.85}Co_{0.12}Al_{0.030}$ was obtained as a composite oxide B. Lithium hydroxide and $Ni_{0.85}Co_{0.12}Al_{0.030}$ were dry-mixed such that the atomic ratio: Li/(Ni+Co+Al) of Li to the total of Ni, Co and Al became 1.05/1. A raw material mixture was thus prepared.

Second Step

The raw material mixture was compression-molded by dry process using a briquette molding machine, to obtain an almond-like molded body A1 (maximum length L=28 mm, minimum length h=14 mm, aspect ratio: h/L=0.5). The density of the molded body A1 was approximately 1.75 $g/cm^3$.

Third Step

The molded bodies A1 were packed in a ceramics (mullite-cordierite) rectangular parallelepiped container of 330 mm long, 330 mm wide and 220 mm deep in outer dimensions having a bottom and a side wall of 10 mm thick.

The bottom and the side wall were provided with a plurality of through-holes of 4 mm in diameter as vent holes, and the porosity of the bottom and the side wall was set to 51%. The space ratio Rs occupied by the gaps between the molded bodies A1 was 0.42. The mass of the molded bodies A1 packed in the container was 18 kg. The height measured from the inner surface of the bottom to the level LU of the packed molded bodies A1 was 190 mm (90.5% of the depth 210 mm of the container).

Next, the molded bodies A1 were sintered at 750° C. for 5 hours in an oxidizing atmosphere (oxygen concentration: 99%), to obtain sintered bodies (lithium-nickel composite oxide) A1.

The obtained lithium-nickel composite oxide had a composition represented by $Li_{1.05}Ni_{0.85}Co_{0.12}Al_{0.03}O_2$. The composition of the lithium-nickel composite oxide was analyzed by ICP emission spectrometry.

Example 2

Sintered bodies A2 were obtained in the same manner as in Example 1, except that in the third step, only the side wall of the container was provided with a plurality of through-holes of 4 mm in diameter, and the porosity of the side wall was set to 510%.

Example 3

Sintered bodies A3 were obtained in the same manner as in Example 1, except that in the third step, a container made of a spongy ceramic foam (mullite-cordierite) and having a bottom and a side wall provided with continuous pores of 2 to 3 mm in diameter was used, and the porosity of the bottom and the side wall was set to 82%.

Example 4

Sintered bodies A4 were obtained in the same manner as in Example 1, except that in the third step, the diameter of the through-holes was changed to 1 mm, and the porosity of the bottom and the side wall was set to 51%.

Example 5

Sintered bodies A5 were obtained in the same manner as in Example 1, except that in the third step, a container made of a spongy ceramic foam (mullite-cordierite) and having a bottom and a side wall provided with spheroidal continuous pores of 3 mm in shorter diameter and 5 mm in longer diameter was used, and the porosity of the bottom and the side wall was set to 52%.

Example 6

Sintered bodies A6 were obtained in the same manner as in Example 1, except that in the third step, only the bottom of the container was provided with a plurality of through-holes of 4 mm in diameter, and the porosity of the bottom and the side wall was set to 51%.

Example 7

In the second step, the raw material mixture was molded into a spherical shape of 6 mm in diameter, to obtain a molded body A2. The density of the molded body A2 was approximately 1.75 g/cm$^3$. Sintered bodies A7 were obtained in the same manner as in Example 1, except that the molded bodies A2 were used, the space ratio Rs occupied by the gaps between the molded bodies A2 was set to 0.37, and the mass of the molded bodies A2 packed in the container was reduced to 13 kg.

Comparative Example 1

Sintered bodies B1 were obtained in the same manner as in Example 1, except that in the third step, neither the bottom nor the side wall was provided with a plurality of through-holes, a non-porous plate-like material (porosity: 0%) was used, and the mass of the molded bodies A1 packed in the container was reduced to 13 kg.

Reference Example 1

Sintered bodies C1 were obtained in the same manner as in Example 1, except that the second step was omitted, and the raw material mixture was packed as it was in the powder form into the container, neither the bottom nor the side wall was provided with a plurality of through-holes, a non-porous plate-like material (porosity: 0%) was used, and the mass of the raw material mixture packed in the container was reduced to 8 kg.

Evaluation

The crystallite size of the molded bodies A1 to A7, B1 and C1 obtained in Examples 1 to 7, Comparative Example 1, and Reference Example 1 were determined. Specifically, each molded body was subjected to X-ray diffractometry (XRD), to give an X-ray diffraction pattern thereof. Next, with respect to the obtained X-ray diffraction pattern, pattern fitting was performed by WPPF (whole-powder-pattern fitting) using all the diffraction peaks present between $2\theta=10°$ to 120°. On the basis of the result, the crystallite size was calculated. The values of the obtained crystallite size are shown in Table 1 as relative values, with respect to the value of Reference Example 1 which is taken as 100. The higher and the closer to 100 the numerical value is, the more excellent the crystallinity is.

TABLE 1

| Sintered body | Bottom | Side wall | Space ratio Rs | Porosity (%) | Packed mass (kg) | Crystallinity |
|---|---|---|---|---|---|---|
| A1 | through-holes | through-holes | 0.42 | 51 | 18 | 99.9 |
| A2 | — | through-holes | 0.42 | 51 | 18 | 96.3 |
| A3 | spongy | spongy | 0.42 | 82 | 18 | 97.3 |
| A4 | through-holes | through-holes | 0.42 | 51 | 18 | 97.6 |
| A5 | spongy | spongy | 0.42 | 52 | 18 | 98.0 |
| A6 | through-holes | — | 0.42 | 51 | 18 | 85.8 |
| A7 | through-holes | through-holes | 0.37 | 51 | 13 | 100 |
| B1 | — | — | 0.42 | — | 13 | 79.9 |
| C1 | — | — | — | — | 8 | 100 |

Comparison of the molded bodies A1 to A7 of Examples with the molded body B1 of Comparative Example 1 shows that by providing the container with vent holes, the crystallinity of the sintered bodies can be remarkably improved even when the mass of the molded bodies packed in the container is increased.

In the sintered bodies C1 of Reference Example 1, the mass of the raw material mixture packed in the container was considerably small. In this case, without providing the container with vent holes, sufficient crystallinity can be obtained. However, in consideration of productivity, at least 13 kg or more of the raw material mixture should be packed into one container when using a container having the same size as that used in the above Examples. In this case, it would be imperative to make the raw material mixture into a molded body.

Comparison of the molded bodies A1 to A6 with A7 of Examples shows that the mass of the molded bodies packed in the container has a great influence on the crystallinity. The comparison further shows that by providing the container with vent holes, the mass of the molded bodies packed in the container can be significantly increased, with the crystallinity of the sintered bodies kept high.

INDUSTRIAL APPLICABILITY

The lithium-transition metal composite oxide obtained by the production method according to the present disclosure can be suitably used as, for example, a positive electrode active material for a secondary battery required to have a high capacity.

REFERENCE SIGNS LIST

1 electrode group
2 positive electrode lead
3 negative electrode lead
4 battery case
5 sealing plate
6 negative electrode terminal
7 gasket
8 sealing stopper

The invention claimed is:

1. A method for producing a lithium-transition metal composite oxide, comprising steps of:
   preparing a mixture including a lithium-containing compound and a transition metal compound;
   obtaining a molded body of the mixture; and
   sintering the molded bodies in a container having at least one vent hole, to obtain sintered bodies, a material of the container including ceramics.

2. The method for producing the lithium-transition metal composite oxide according to claim 1, wherein
   the container has a bottom and a side wall rising from a periphery of the bottom, and at least one of the bottom and the side wall has the at least one vent hole.

3. The method for producing the lithium-transition metal composite oxide according to claim 2, wherein a porosity of at least one of the bottom and the side wall is 51% or more and 82% or less.

4. The method for producing the lithium-transition metal composite oxide according to claim 1, wherein an average opening area of the at least one vent hole is 0.7 mm$^2$ or more and 20 mm$^2$ or less.

5. The method for producing the lithium-transition metal composite oxide according to claim 1, wherein the molded body has a maximum length L of 6 mm or more.

6. The method for producing the lithium-transition metal composite oxide according to claim 1, wherein a ratio: h/L of a minimum length h of the molded body to a maximum length L of the molded body is 0.4 or more and 1.0 or less.

7. The method for producing the lithium-transition metal composite oxide according to claim 1, wherein a space ratio occupied by gaps between the molded bodies in the container is 0.35 or more.

* * * * *